(12) United States Patent
Nir et al.

(10) Patent No.: US 6,190,710 B1
(45) Date of Patent: Feb. 20, 2001

(54) PLASTIC PACKAGING MATERIAL

(75) Inventors: Moira Marx Nir, Moreshet; Angel Machado, Karmiel; Nehemia Aharoni, Mazkeret Batya, all of (IL)

(73) Assignees: Stepac L.A., The Sterilizing Packaging Company of L.A., Ltd., Western Galilee; State of Israel - Ministry of Agriculture, Agricultural Research Organization, Bet Dagan, both of (IL)

(*) Notice: Under 35 U.S.C. 154(b), the term of this patent shall be extended for 0 days.

(21) Appl. No.: 08/918,584

(22) Filed: Aug. 19, 1997

Related U.S. Application Data

(63) Continuation-in-part of application No. PCT/US96/02254, filed on Feb. 20, 1996.

(51) Int. Cl.[7] ............................ B65B 31/00; B65D 33/01; A23B 7/00
(52) U.S. Cl. .................. 426/106; 426/108; 426/118; 426/395; 426/410; 426/415; 426/419; 383/103; 428/35.2; 428/35.5; 428/137; 428/213
(58) Field of Search .................. 428/35.2, 35.5, 428/131, 137, 213, 474.4; 426/106, 118, 108, 395, 410, 415, 419; 383/103

(56) References Cited

U.S. PATENT DOCUMENTS

| | | | |
|---|---|---|---|
| 3,682,028 | 8/1972 | Clayton et al. ................ 83/30 |
| 3,876,738 | 4/1975 | Marinaccio et al. ............ 264/41 |
| 4,079,152 | 3/1978 | Bedrosian et al. .............. 426/124 |
| 4,265,915 | * 5/1981 | McLennan et al. ............. 426/28 |
| 4,842,741 | 6/1989 | Coughlin et al. ............... 210/500.36 |
| 4,895,729 | * 1/1990 | Powrie et al. ................... 426/316 |
| 4,982,872 | * 1/1991 | Avery ............................. 220/461 |
| 5,037,459 | 8/1991 | Spruill et al. .................... 55/387 |
| 5,405,561 | 4/1995 | Dais et al. ....................... 264/40.1 |
| 5,492,705 | 2/1996 | Porchia et al. .................. 426/106 |
| 5,565,230 | * 10/1996 | Bailey ............................ 426/411 |
| 5,616,354 | * 4/1997 | Tompkins et al. ............... 426/324 |

FOREIGN PATENT DOCUMENTS

| | | |
|---|---|---|
| 636284 | 4/1993 | (AU) . |
| 0 351 116 | 1/1990 | (EP) . |
| 538713 | 4/1993 | (EP) . |
| 566097 | 10/1993 | (EP) . |
| 358038 | 3/1996 | (EP) . |
| 0 737 709 | 10/1996 | (EP) . |
| 2221692 | 2/1990 | (GB) . |
| 57-167331 | 10/1982 | (JP) . |
| 1-148144 | 6/1989 | (JP) . |
| 1-167062 | 6/1989 | (JP) . |
| 1-309621 | 12/1989 | (JP) . |
| 3-059196 | 3/1991 | (JP) . |
| 4-074529 | 3/1992 | (JP) . |
| 4-210552 | 7/1992 | (JP) . |
| 5-168400 | 7/1993 | (JP) . |
| 5-230235 | 9/1993 | (JP) . |
| 5-316943 | 12/1993 | (JP) . |
| 5-329947 | 12/1993 | (JP) . |

(List continued on next page.)

OTHER PUBLICATIONS

N. Aharoni, et al., Use of Newly–Developed Films for Modified Atmosphere and Modified Humidity Packaging of Fresh Vegetables, Int'l Congress for Plastics in Agriculture, Dan Panorama, Tel Aviv, 1996 (abstract).

(List continued on next page.)

Primary Examiner—Rena L. Dye
(74) Attorney, Agent, or Firm—Ladas & Parry

(57) ABSTRACT

A method of preserving produce by providing a plastic packaging material having a thickness of up to about 500 microns and a permeability to water vapor exceeding about 1.5 g mm m$^{-2}$ per day at 38° C. and 85–90% relative humidity, whereby when the material is used to package produce, no condensation or minimal condensation appears on a surface of the material. Related methods and products produced thereby are also described and claimed.

23 Claims, 1 Drawing Sheet

FOREIGN PATENT DOCUMENTS

| | | |
|---|---|---|
| 6-062728 | 3/1994 | (JP) . |
| 6-071766 | 3/1994 | (JP) . |
| 8-164590 | 6/1996 | (JP) . |
| WO 84/04529 | 11/1989 | (WO) . |
| WO 93/02130 | 2/1993 | (WO) . |
| WO 93/22207 | 11/1993 | (WO) . |

OTHER PUBLICATIONS

English abstract of JP 05–329947 of Dec. 1993.
English abstract of JP 06–071766 of Mar. 1994.
English abstract of JP 05–316943 of Dec. 1993.
English abstract of JP 01–148144 of Jun. 1989.
English abstract of JP 57–167331 of Oct. 1982.
English abstract of JP 01–167062 of Jun. 1989.
English abstract of JP 03–059196 of Mar. 1991.
English abstract of JP 06–062728 of Mar. 1994.
English abstract of JP 04–074529 of Mar. 1992.
English abstract of JP 01–309621 of Dec. 1989.
English abstract of JP 05–230235 of Sep. 1993.
English abstract of JP 05–168400 of Jul. 1993.
English Abstract of EP 0737709 dated Oct. 16, 1996.

* cited by examiner

PLASTIC PACKAGING MATERIAL

This application is a continuation-in-part of International Application PCT/US96/02254 filed on Feb. 20, 1996 and which designated the U.S.

FIELD OF THE INVENTION

The present invention relates to plastic packaging materials generally, and more particularly to plastic packaging materials for packaging produce and horticultural products, as well as packaging techniques and packaged products.

BACKGROUND OF THE INVENTION

A great variety of plastic packaging materials is known in the art. The following patents and published patent applications are thought to be representative of the state of the art, particularly in the field of nylon-6 packaging materials, packaging for produce and control of humidity in packaging:

U.S. Pat. Nos. 5,492,705, 5,405,561, 5,037,459, 4,842,741, 3,876,738, and 3,682,028;

Japanese Patent Documents 05-329,947, 06-071,766, 05-316,943, 01-148,144, 57167,331, 01-167062, 03-059,196, 06-062,728, 04-074,529, 01-309,621, 05-230,235, 05-168,400, and 04-210,552;

European Patent Documents 358,038, 538,713, and 566,097;

PCT Patent Applications 8404529 and 9302130; and

Australian Patent 636,284.

SUMMARY OF THE INVENTION

The present invention seeks to provide an improved plastic packaging material which has a relatively high permeability to water vapor.

There is thus provided in accordance with a preferred embodiment of the present invention a plastic packaging material having a thickness of up to about 500 microns and a permeability to water vapor exceeding about 1.5 g mm m$^{-2}$ per day at 38° C. and 85–90% relative humidity (RH). The material allows for minimal or no condensation on its surface when used to package produce.

There is also provided in accordance with a preferred embodiment of the present invention a packaged produce including a plastic packaging material having a relatively high permeability to water vapor and providing an atmosphere for the packaged produce which comprises 4–20% $O_2$, 0.5–17% $CO_2$, and has a relative humidity of 85–100%.

There is additionally provided in accordance with a preferred embodiment of the present invention a method of preserving produce comprising:

providing a plastic packaging material of the type described hereinabove; and at least partially enclosing the produce using the plastic packaging material, thereby to provide an environment for the produce which comprises approximately 4–20% $O_2$, 0.5–17% $CO_2$, and has a relative humidity of 85–100%.

In accordance with a preferred embodiment of the present invention, the composition of the plastic packaging material includes homopolymers or copolymers with chemical groups that are given to hydrogen bonding or association with water, for example homopolymers or copolymers containing amides, esters, anhydrides, or urethanes, or their derivatives, or containing acyl groups, carboxyl groups, or alcohol groups, or their derivatives.

Preferably, the plastic packaging material includes a polyamide such as nylon-6 or nylon-66 or copolyamides such as nylon-6/66 or nylon-6/12. For example, the material may be manufactured from a polymeric material that comprises a blend of nylon-6 or nylon-66, nylon 6/66, or nylon 6/12 with other polymeric and/or non-polymeric components.

In accordance with a preferred embodiment of the present invention, the raw material may be manipulated to increase the $O_2$ and $CO_2$ permeability of the film. For example, blends of nylon-6 and other components may be manufactured into a material having a porous character. Additionally or alternatively, the plastic packaging material may be manipulated after the film is formed, for example the plastic packaging material may be perforated. Preferably, the plastic packaging material may be macroperforated to have holes of approximately 1–10 mm diameter covering up to about 0.5% of the surface area of the material, or the plastic packaging material may be microperforated to have holes of approximately 0.05–1 mm diameter in a density of up to about 2000 holes per square meter of the material. Even more preferably, the plastic packaging material may be microperforated to have holes of approximately 0.3–0.8 mm diameter in a density of up to about 500 holes per square meter of the material.

In accordance with a preferred embodiment of the present invention, the raw material may be manipulated to tailor its permeability to water vapor, so as to either increase or decrease water vapor permeability. For example, blends of nylon-6 or nylon 6/66 with other raw materials may be processed to provide a film with a lower water vapor permeability or a higher water vapor permeability than a film processed from nylon-6 alone.

Additionally or alternatively, the packaging material may be manipulated by heat treatment or orientation processes to reduce its water vapor permeability.

Additionally or alternatively, the packaging material may be manipulated by steam treatment or other processes to increase its water vapor permeability.

In accordance with a preferred embodiment of the present invention, the raw material or resulting packaging material may be manipulated to absorb or degrade ethylene gas. For example, blends of polyamides with other materials which absorb or degrade ethylene may be employed in the manufacture of the packaging material, or the resulting packaging material may be coated or laminated with materials which absorb or degrade ethylene gas.

There is additionally provided in accordance with a preferred embodiment of the present invention a method for producing optimized packaging materials for packaging produce in an environment which is optimized in terms of gaseous composition and water condensation, the method including the steps of:

determining sensitivity of produce to at least carbon dioxide concentration and the presence of water condensation in an environment;

providing a plurality of package precursor materials having differing water vapor permeabilities;

selecting a package precursor material having a suitable water vapor permeability;

perforating a package material selected in the selecting step to an extent at least partially determined by the sensitivity of a product to at least carbon dioxide concentration in order to produce an optimized packaging material.

Thereafter, a packaging method may also include applying the optimized packaging material to the produce for packaging thereof.

In accordance with a preferred embodiment of the present invention, the step of perforating includes selecting the number of a preselected size perforations per unit of the optimized packaging material.

It is noted that throughout the specification and claims the term "produce" refers particularly but not exclusively to fruits, vegetables, flowers, plants, fungi, and other edible or inedible horticultural or botanical products which tend to spoil or otherwise have a limited shelf life.

It is further noted that throughout the specification and claims the term macroperforation refers to holes of approximately 1–10 millimeters (mm) diameter covering up to about 0.5% of a surface area.

It is further noted that throughout the specification and claims the term microperforation refers to holes of approximately 0.05–1 mm diameter in a density of up to about 2000 holes per square meter of a surface area.

BRIEF DESCRIPTION OF THE DRAWING

For a better understanding of the invention, and to show how the same may be carried into effect, reference will now be made, purely by way of example, to the accompanying drawing in which.

DETAILED DESCRIPTION OF PREFERRED EMBODIMENTS

Figure 1:
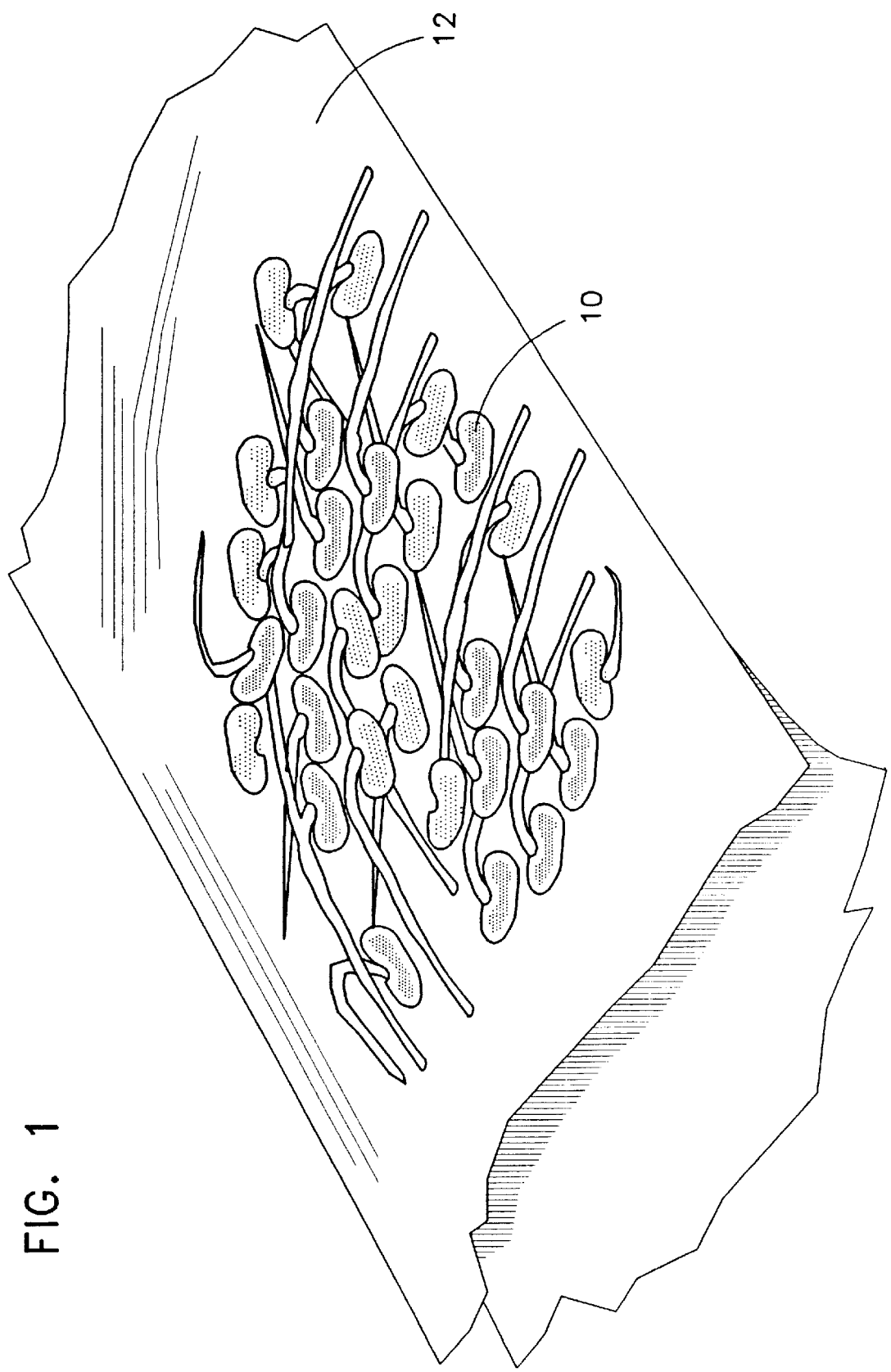
FIG. 1 is a simplified illustration of produce packaging constructed and operative in accordance with a preferred embodiment of the present invention.

Reference is now made to FIG. 1, which illustrates packaging for produce, constructed and operative in accordance with a preferred embodiment of the present invention. FIG. 1 shows produce 10, such as bean sprouts, enclosed within a bag 12 preferably constructed wholly or in part from a plastic packaging material such as nylon-6. It is appreciated that a package or wrap other than bag 12 may be provided. The nylon-6 may be extrusion blown or produced in any other conventional manner from materials such as, but not limited to, Capron® 8209, commercially available from Allied Signal, or Ultramide® B4, commercially available from BASF.

In accordance with a preferred embodiment of the present invention, the plastic packaging material includes homopolymers or copolymers with chemical groups that are given to hydrogen bonding or association with water, for example homopolymers or copolymers containing amides, esters, anhydrides, or urethanes, or their derivatives, or containing acyl groups, carboxyl groups, or alcohol groups, or their derivatives.

Preferably, the composition of the plastic packaging material includes a polyamide such as nylon-6 or nylon-66, commercially available from Allied Signal as Capron® 3090FN, or copolyamides such as nylon-6/66, commercially available from Allied Signal as Capron® CA95YP, or nylon-6/12, commercially available from EMS as Grilon® CR8. For example, the material may be manufactured from blends containing nylon-6, nylon-66, nylon 6/66, or nylon 6/12 with other polymeric and/or non-polymeric components. For such polyamides alone, oxygen ($O_2$) permeability is about 0.4–1.5 $cm^3$ $mm/m^2$ day atm and carbon dioxide ($CO_2$) permeability is about 1.8–3.0 $cm^3$ $mm/m^2$ day atm when measured at 23–25° C. and 0% RH.

The plastic packaging material may additionally comprise a blend of polyamides with other homopolymer polyamides. By blending a given polyamide with a second polyamide having a higher percentage of amide groups than the original polyamide, the water vapor permeability of the blend will usually be higher than that of the original polyamide. By blending a given polyamide with a second polyamide having a lower percentage of amide groups than the original polyamide, the water vapor permeability of the blend will usually be lower than that of the original polyamide.

For example, nylon-6 material may be blended with nylon-11 or nylon-12 to produce films having reduced water vapor permeability relative to that of nylon-6 alone and are characterized by minimal moisture condensation on the film surface when used to package produce.

Alternatively, the plastic packaging material may comprise a blend of polyamides with copolymers containing amide groups. For example, blends of nylon 6/66 copolymer with nylon-6, in an amount ranging from 5–100% nylon 6/66 give increased water vapor permeability and gloss relative to nylon-6 alone. For further example, the plastic packaging material may comprise nylon-6 blended with nylon-6I/6T, commercially available from Du Pont as SELAR® PA 3426, to produce films of 20 and 30 micron thickness. The ratios may be between 80–99% nylon-6 and 1–20% nylon-6I/6T. The resulting films have reduced water vapor permeability relative to nylon-6 alone and retain the ability to minimize condensation.

Alternatively, the plastic packaging material may comprise polyamides or other hydrogen bonding polymers blended with polyether-block-amides, such as Pebax® MX1205, commercially available from Elf Atochem, to increase water vapor permeability of the material relative to the polymers without polyether-block-amides.

The plastic packaging material may comprise a blend of polyamides with polymers not totally compatible with polyamides wherein the matrix polymer accounts for 80% or more of the overall composition. In such blends, polyamide generally comprises the major component but alternatively it could compromise a minor component of the blend. For example, blends of nylon-6 or nylon 6/66 with ethylene acrylic acid copolymer (EAA), for example Primacor® 1420 commercially available from Dow Plastics, reduce water vapor permeability relative to the base polyamide alone and reduce raw material costs.

For further example, the plastic packaging material may comprise a blend of nylon-6 and polyolefins and compatibilizers, such as Orgalloy® LE6000, commercially available from Elf Atochem. Such blends can be employed to produce films having reduced water vapor permeability relative to that of nylon-6 alone and are characterized by minimal moisture condensation on the film surface when used to package produce. When nylon-6 is approximately 40–60% of the blend, $O_2$ permeability of the resulting film is about 2.0–5.0 $cm^3$ $mm/m^2$ day atm and $CO_2$ permeability is about 11–13 $cm^3$ $mm/m^2$ day atm when measured at 23–25° C. and 0% RH.

Additionally, the plastic packaging material may be extrusion blended with porous additives, such as silica or diatomaceous earth, to produce films which are characterized by ethylene sorption and by minimal moisture condensation on the film surface when used to package produce. The ratios may be between 88–99% base polymer and 0.5–12% porous additive. Additionally or alternatively, the resulting packaging material may be coated, laminated, or otherwise combined with materials which absorb or degrade ethylene gas.

Additionally in accordance with a preferred embodiment of the present invention, the material may incorporate processing additives or additives that facilitate use of the package, for example heat stabilizers, if the package additionally is to be used after storage as a cooking or baking bag, or antiblock or slip additives to aid processing and handling of the resulting materials.

Additionally in accordance with a preferred embodiment of the present invention, the material may incorporate additives that provide additional benefit to the packaged product, for example additives containing preservatives, or components for insect control, or for control of unwanted growth such as fungi, microbes or bacteria. Alternatively, the formed material may be subsequently processed with additives, such as by use of coatings containing such additives or by lamination or any other suitable method for incorporation of additives into the package or on the package surface.

Additionally in accordance with a preferred embodiment of the present invention, the films may be oriented during manufacture or in a subsequent processing step to provide films having reduced water vapor permeability relative to unoriented films made of the same raw materials. The oriented material is characterized by minimal moisture condensation on the material surface when used to package produce.

Further in accordance with a preferred embodiment of the invention, films of polyamide with or without the above described additives and compositions and having thicknesses of 5–100 microns may be passed through a heating tunnel to beat the film to temperatures of 100–200° C. to provide films having reduced water permeability relative to polyamide that is not heat-treated and are characterized by minimal moisture condensation on the film surface when used to package produce.

Additionally in accordance with a preferred embodiment of the present invention a polyamide material may be extrusion blended with soluble starch or salt additives and then passed through a water bath at 4–100° C. to extract the soluble additive in order to produce films having increased $O_2$ and $CO_2$ permeability relative to the base polyamide alone. The ratios may be between 88–99% polyamide and 1–12% soluble starch or salt additive. The bath water preferably is circulated, filtered and reintroduced to the bath on a continuous basis. Excess water is preferably removed from the film by passing it through a heating tunnel as described in the preceding paragraph.

Trays, baskets, containers, holders, bags, films, liners or any other package or wrap formed from polyamides or any other suitable polymer composition having water permeability exceeding 1.5 g mm $m^{-2}$ per day at 38° C., with or without the additives or compositions described above, may be provided by extrusion or any other suitable manufacturing process.

In accordance with a preferred embodiment of the present invention, the products to be packaged are produce such as whole or lightly processed fruits or vegetables, cut flowers, and plants.

The present invention may also be employed for auxiliary packages for pre-packaged produce. For example, pre-packaged bags, trays, containers, or wraps holding produce may be placed in an auxiliary package manufactured according to the present invention.

Film and sheets manufactured from any of the materials and/or by any of the techniques described by the present invention may be unperforated or they may be perforated to increase the gas transmission through the film, especially to $O_2$ and $CO_2$ gas.

Preferably microperforation is carried out with holes of 0.3–0.8 mm diameter in a density of up to about 500 holes per square meter of the material.

Perforation may take place either in a continuous or in a batch process. For example, the perforation may be effected by contacting the material with one or more rollers, plates or other devices studded with appropriately sized and positioned pins or needles. Alternatively, the perforation may be effected by use of laser technology. Perforation may occur during extrusion of the material downstream of a bubble collapsing frame or in tandem with a subsequent processing step such as printing or package forming.

In accordance with a preferred embodiment of the present invention an optimized packaging material for packaging produce in an environment which is optimized in terms of gaseous composition and water condensation may be produced in the following manner: determine the sensitivity of the produce preferably to carbon dioxide concentration and the presence of water condensation, provide one or more package precursor materials having differing water vapor permeabilities, select a package precursor material having a suitable water vapor permeability, and perforate the package material to an extent at least partially determined by the sensitivity of the produce to carbon dioxide concentration to produce an optimized packaging material. The perforations may be of a preselected size per unit of the optimized packaging material.

The present invention allows for the tailoring of an appropriate oxygen and carbon dioxide atmosphere, humidity environment, and level of surface condensation for the specific produce packaged. Tailoring of the oxygen and carbon dioxide environment for the packaged produce is achieved by perforating the packaging material or otherwise rendering the material to have a porous nature.

An optimal modified oxygen and carbon dioxide atmosphere alone may not solve problems caused by excessive in-package humidity and condensation, such as growth of undesirable molds, fungi, or bacteria. By controlling film composition and thickness, the present invention provides beneficial levels of humidity in the package while preventing excessive in-package condensation.

Control of both moisture and gas composition in the package allows a delay in the ripening processes, preservation of the produce, quality, prevention or reduction of physiological disorders, and storage life extension.

Sensitivity of produce to at least carbon dioxide concentration and the presence of water condensation in an environment, for a given set of gaseous and humidity conditions and temperature and time of storage, is evaluated in terms of product freshness characteristics such as appearance and color of fruit and stems, extent and type of decay, extent of shedding from clusters, weight loss, taste, smell, and turgidity.

Selection of the packaging precursor material takes into account possible physiological and pathological responses of the commodity to humidity and condensation inside the package, anticipated humidity fluctuations during storage, raw material cost, and sometimes physical properties of the material such as optical properties and strength properties.

The extent to which the material is perforated accounts for estimated respiratory activity and weight of the specific commodity to be packaged, anticipated temperature fluctuations during storage and shelf-life, and possible physiological and pathological responses of the commodity to carbon dioxide and oxygen concentrations in the package. Respiratory activity is a function of temperature. Ideally, produce is stored at temperatures of –5° C. to 15° C. during cold storage. Optimal temperature depends on the specific commodity stored.

Film and sheets manufactured from any of the materials listed above and/or by any of the techniques listed above may be additionally converted, for example they may be cut to sheets for flowpack packaging machine applications, or processed into ZIPLOCK®-type bags, or gussetted for carton liners or other applications.

Packages manufactured with any of the materials and/or by any of the techniques described by the present invention may be provided with any means of closure, for example packages may be closed by heat sealing or with any known auxiliary closure method.

Packages manufactured with any of the materials and/or by any of the techniques described by the present invention may also be employed for down-stream applications involving the packaged produce, such as freezing, baking, cooking, or microwaving applications.

Due to the reduction of condensation and creation of an appropriate modified atmosphere, the present invention may reduce or eliminate the need for some chemical and physical treatments of the produce. Packages manufactured from materials described in the present invention therefore may be employed instead of or together with chemical or physical treatments of the produce. Such treatments include, for example, washing of commodities prior to packing, as is beneficial with peppers, melons, and mangos; treatments for insect control or to control crown rot, as with bananas; addition of absorbent paper in the packing box, as with eggplants; or application of $SO_2$-release paper, as with grapes.

Reference is now made to the following examples which provide an indication of the scope of the present invention.

EXAMPLE I

Nylon-6 extrusion blown film having a thickness of 40 microns was employed to package bean sprouts, mushroom, tarragon, chive and chicory lettuce. After 8 days of storage at 4° C. and a relative humidity of 90–97%, the sprouts were inspected and their weight loss was measured and compared with a control package of sprouts which had been stored under identical conditions in PVC film packaging.

The weight loss of the nylon-6 packaged sprouts was found to be less than of the control packaged sprouts. The nylon-6 packaged sprouts had a white color and were crisp, while the PVC packaged sprouts were brown and were not crisp.

The mushrooms were white and fresh after 18 days of storage in nylon-6 packaging. Visual observations of the tarragon, chive and chicory lettuce indicated that they stayed fresher longer in the nylon-6 packaging as compared to polyethylene. (PE) packaging.

EXAMPLE II

Nylon-6 extrusion blown film having a thickness of 20 microns and macroperforations 6–8 mm in diameter was used to package grapes. After 12 days of storage at 0° C. and 7 days storage at 20° C., the condition of the grapes was compared with control packages packaged in both perforated and non-perforated PE. The grapes packaged in nylon-6 showed a higher percentage of healthy clusters and lower levels of decay than the control packages.

EXAMPLE III

Nylon-6 extrusion blown film having a thickness of 20 microns and microperforations 0.8 mm in diameter was used to package snap beans (green beans). After 5 days of storage at 5° C. and 3 days storage at 20° C., the condition of the beans was compared with control packages packaged in micro-perforated PE. The beans packaged in nylon-6 showed less weight loss, less rusty spots and substantially no mold growth as compared with the control packages.

EXAMPLE IV

Nylon-6 extrusion blown film having a thickness of 20 microns in both macroperforated and microperforated forms was used to package cucumbers. After 6 days of storage at 8° C. and 3 days storage at 20° C., the condition of the cucumbers was evaluated and was found to be very good. The cucumbers packed in microperforated packages showed no chilling injury, while those in macroperforated packages showed very low chilling injury.

EXAMPLE V

A blend of 20% nylon 6I/6T and 80% nylon-6 was extrusion blown into a film 20 microns thick, microperforated, and used to package cherry tomatoes. After a number of days, there was no condensation in the packages and the tomato quality was better than that of tomatoes packaged in alternative materials.

EXAMPLE VI 30 micron thick nylon-66 film, manufactured by a chill-roll cast process, biaxially oriented by means of tenter frame orientation equipment and then passed through a heating tunnel at 200° C., was used to wrap cut flowers.

EXAMPLE VII

A copolymer of nylon-6 and nylon-66 is extruded into a film 20 microns thick via a blown film double-bubble process that imparts a high degree of orientation to the film. The film is then microperforated and used to package lettuce.

EXAMPLE VIII

A blend of nylon 610 and 8% soluble starch is extruded into a 15 micron thick film by a water quench cast film process. The soluble starch is extracted during the water quenching stage, leaving a porous film which is then passed tlhough a heating tunnel and ultimately used to package green and red peppers.

EXAMPLE IX

A blend of 95% nylon-11 and 5% nylon 6I/6T is extruded in a chill-roll cast process to produce a sheet 150 microns thick. This material is then perforated and thermoformed into trays to package corn.

EXAMPLE X

Nylon-6 extrusion blown film having a thickness of 20 microns was formed into bags, microperforated and used to store 5 kilograms (kg) of zucchini at 5° C. and 10° C. Bags were microperforated with 50 holes of 0.7 mm diameter each for zucchinis stored at 5° C. and with 70 holes for those stored at 10° C. The bags were filled, closed with a rubber band, and stored for 21 days.

The packages maintained a favorable atmosphere of 8–9% $CO_2$ and 12–14% $O_2$ and a beneficial humidity of 96% RH without condensation. At 21 days storage time, the zucchinis still had a good appearance. Those stored at 5° C. showed nearly no decay and those stored at 10° C. showed about 2% decay, whereas control zucchinis in perforated PE bags showed extensive decay and had a poor appearance.

Nylon-6 film with a thickness of 15 microns was manufactured into bags, microperforated with 30 holes of 0.6 mm diameter each, and used to store 11 pre-packed trays of 4 ears of end-trimmed sweet corn overwrapped with PVC film. The corn was stored at 4–5° C. Additional pre-packed trays that were not placed in nylon-6 bags served as controls. After 9 days, all of the control cobs were contaminated with bacteria. Noticeable amounts of bacteria started to appear on the trays packed within the nylon-6 bags only after 14 days.

Nylon-6 film with a thickness of 20 microns was formed into bags and macroperforated with 8 holes, each 6 mm in diameter. The film was used to pack chili peppers. After 30 days at 6° C., the peppers were in excellent condition.

Nylon-6 film with a thickness of 20 microns was formed into bags and microperforated with 30 holes of diameter 0.6 mm each. The bags were used to wrap 12 kg of banana bunches. The product was then stored at 14° C. After 45 days, the fruit was still green and firm with no decay on the cuts. In comparison, bananas stored in macroperforated PE bags and bananas pretreated with fungicide and stored in commercial PE bags without holes were very soft, had darkened, and showed extensive decay. After ethylene treatment for 24 hours at 18° C. and an additional 5 days of shelf life storage at 18° C., the bananas stored in the nylon-6 bags had ripened nicely and had the requisite level of taste.

EXAMPLE XI

Nylon-6/66 was extrusion blown into a plastic film 18 micron thick. The material was characterized as having a water vapor permeability of approximately 8.5 g mm m$^{-2}$ per day when measured at 38° C. and 85–90% RH, and an $O_2$ permeability of 0.9–1.0 cm$^3$ mm/m$^2$ day atm when measured at 23–25° C. and 0% RH. Since this material has a relatively high permeability to water vapor, it was used to package melons, which are very sensitive to condensation. The film was cut and heat sealed to form a carton liner and microperforated with 12 holes 0.5 mm diameter each. Groups of 8 Cherantais melons were packed in these liners and stored for 12 days at 7° C. and 11° C., the latter temperature being the conventional packing temperature because lower temperatures with customary packing methods cause chilling injury in the fruit.

The melons had a good taste and remained in good condition at 11° C. and in very good condition at 7° C. Also, they did not show chilling injury at 7° C. The ability to store and ship at the lower temperature allows for longer storage life of the melons.

EXAMPLE XII

A blend of 74% nylon-66, 25% nylon-6, and 0.9% heat stabilizer is extrusion blown into a plastic film 20 micron thick. The material is characterized as having a water vapor permeability of approximately 4–5 g mm m$^{-2}$ per day when measured at 38° C. and 85–90% RH, and an estimated $O_2$ permeability of about 0.35 cm$^3$ mm/m$^2$ day atm when measured at 23–25° C. and 0% RH.

The material is formed into a bag, microperforated with 20 holes of 0.85 mm diameter each and used for packing and storing 2 kg fresh green beans at 5° C. Additional film is microperforated with 50 holes and used for packing and storing 5 kg green beans. Subsequent to storage, the beans are boiled, steamed, or microwaved in the bag. Following partial consumption of the beans, leftover beans are frozen in the bag.

EXAMPLE XII

A blend of 10% nylon 6I/6T and 90% nylon-6 is extrusion blown into a film of 25 microns thickness and characterized as having a water vapor permeability of approximately 4–6 g mm m$^{-2}$ per day when measured at 38° C. and 85–90% RH. The film is then microperforated at a set interval corresponding to the length of an ear of corn plus approximately 10 centimeters, where each set of microperforations consists of 6 holes of 0.3 mm diameter each. The film is then run on a flowpack package converter and used to cover a consumer pack tray holding 2 ears of sweet corn with the husks removed. The packages allow for minimal condensation on the film surface and moderate build-up of carbon dioxide, and the film has high gloss that is desirable for consumer packages.

EXAMPLE XIV

A blend of nylon-6 with 10% EAA was extrusion blown into a plastic film 20 micron thick and characterized as having a water vapor permeability of approximately 4–6 g mm m$^{-2}$ per day when measured at 38° C. and 85–90% RH and an $O_2$ permeability of approximately 0.8 cm$^3$ mm/m$^2$ day atm when measured at 23–25° C. and 0% RH. The film was formed into a gusseted bag, microperforated with 48 holes of approximately 0.6 mm diameter each, and used to package broccoli. The bag was then placed in a carton, filled with 11 kg of broccoli heads, and closed with a rubber band. The broccoli was then stored for 9 days at 0–1° C. and an additional 4 days at 4° C.

Testing showed that $CO_2$ level was 12–13% in the bags at the end of this time period. The florets remained green and firm, stems remained fresh, and the broccoli showed nearly no decay compared to measurable decay and floret discoloration in control cartons without bags. Field tests with these bags allowed broccoli to be shipped without customary application of ice and waxed boxes, resulting in an improved shipment at about ⅓ the cost.

The same film was formed into bags of a different size, microperforated with 10 holes of approximately 0.8 mm diameter, and used to store 10 macroperforated polystyrene (PS) punnets containing strawberries. Each punnet contained approximately 250 grams of strawberries.

After 15 days at 1° C. and an additional 2 days at 18° C., $CO_2$ concentration in the bags was about 12%. The strawberries had reduced weight loss, fewer blemishes, and less decay compared to punnets not stored in the bags. The fruit in the bags also had better overall appearance and fresh green calyxes. Considerable cost savings can be realized with this improved storage method by allowing customary air shipments of berries to be replaced by less expensive sea or ground transport.

In storage and shelf-life studies with a number of strawberry cultivars, bags manufactured from the composition listed above as well as bags made from films of >99% nylon-6 allowed for delay and reduction in development of *Botrytis cinerea* fungus compared to commercially employed open packages.

The same film was formed into bags without perforations for packaging 3 kg blueberries. The fruit was sealed in the bag and stored at 0° C. for 6 weeks. The resulting atmosphere was 14% $CO_2$ and 7% $O_2$. Weight loss was about 4% and decay level was only 3%, compared to 8% weight loss and 64% decay for fruit stored in PE bags.

EXAMPLE XV

A commercially available blend comprised of approximately 50% nylon-6 with polyethylene and compatibilizer was extrusion blown into a film 20 micron thick, formed into bags, microperforated with 40 holes approximately 0.7 mm diameter each in the lower half of the bag, and used to package 4 kg of mango that had been pre-washed in cool tap water. The bags were closed with a twist-tie, placed in a carton, and stored at 12° C. for approximately 21 days and then 14 additional days at 18–20° C.

The mangos went through normal but slower ripening than control fruits. They were in excellent condition and maintained higher firmness and lower total soluble solids relative to mangos packed in 35 micron thickness PE bags perforated in the same manner as the bags described above and relative to mangos stored without any plastic packaging. Also, the fruits stored in the PE bags were wet and sticky from an undesirable leakage of sap from the fruit, whereas the fruit in the bags comprised of the nylon-6 blend had no sap leakage.

The same film was formed into bags without perforations and used to package 0.8–1 kg of grapes. With Italia cultivar grapes, $CO_2$ was 5% in the bags after 14 days at 0° C. The grapes had firm berries and showed reduced browning of berries and drying of stems relative to grapes packed in commercial PE bags with macroperforations.

The same film was formed into liners and macroperforated with holes 6 mm in diameter, wherein the holes were positioned every 10–20 centimeters from each other. The liners were used to pack sets of 15 kg of standard and organic carrots for 60 days at 1° C. and then 7 additional days at 25° C. The carrots showed a lower incidence of fungi, bacteria, and sprouting with higher overall quality than carrots packed in commercial macroperforated PE bags.

EXAMPLE XVI

Sweet corn is optimally stored at 0–5° C. and shows extended storage capabilities at $CO_2$ levels of approximately 12–18%, but the corn rapidly develops bacteria in the presence of excessive condensation.

Selection of materials for packaging corn optimally takes into account the weight of ears to be packed per bag. For packing of approximately 1–12 ears of corn per bag, a material with a water vapor permeability (WVP) of approximately 2–3 g mm m$^{-2}$ per day when measured at 38° C. and 85–90% RH is suitable, whereas for packing of more than about 12 ears per bag, a material with a higher WVP may be selected. WVP should not be so high so as to lead to excessive and unnecessary weight loss of the packaged corn.

When ears with no husks are packed, packaging bags should be microperforated with a number of holes equal to about 1 hole per number of ears.

When the ears are not husked at all or are lightly processed to leave a few leaves around the ears, the bag should be microperforated with a number of holes equal to about 2 holes per number of ears.

When packing 10 ears of corn without husks, a blend of nylon-6 with polyethylene and compatibilizer was selected for its water vapor permeability of approximately 2.7 g mm m$^{-2}$ per day when measured at 38° C. and 85–90% RH. Film of 20 micron thickness was formed into bags and microperforated with 10 holes of 0.6 mm diameter each.

When packing 50 ears of corn with husks, nylon-6 film was selected for its higher water vapor permeability of approximately 6.0 g mm m$^{-2}$ per day when measured at 38° C. and 85–90% RH. Nylon-6 film of 18 micron thickness was formed into a liner and microperforated with 100 holes of 0.6 mm diameter each.

When the packaged corn described hereinabove was stored at 0–5° C., in-package humidity was 95–98% RH with minimal condensation, and $CO_2$ was raised to 14–17%. Storage life was prolonged 30–40% compared to ice-packed controls without bags. With bags containing 10 ears of corn, no decay was discerned after 16 days at 5° C., compared to significant levels of decay in PE packages containing 10 ears.

EXAMPLE XVII

Red bell peppers are prone to decay when stored in the presence of condensation. These peppers do not respond well to atmospheres with more than about 1% $CO_2$ for most cultivars, though they benefit from a small accumulation of about 0.5% $CO_2$. Optimally they are stored at 6–8° C. For bulk packing of red peppers, a material should be selected with as high a permeability to water vapor as possible so long as the peppers do not subsequently undergo excessive weight loss.

Because of its relatively high water vapor permeability of approximately 7.8 g mm m$^{-2}$ per day when measured at 38° C. and 85–90% RH, film manufactured from 99.5% nylon 6/66 copolymer with 0.5% slip agent was selected for packaging of 5 kg of red bell pepper. Bags were formed from film 20 microns thick. The bags were then microperforated with 160 holes of 0.8 mm diameter each and filled with peppers that had been previously washed in warm water. $CO_2$ level in the bags after 11 days at 8° C. was approximately 0.5–1% and there was minimal in-package condensation. Peppers stored and shipped in this manner were firmer and had reduced decay relative to peppers conventionally stored in cartons without bags.

It will be appreciated by persons skilled in the art that the present invention is not limited by what has been particularly shown and described hereinabove. Rather the scope of the invention is defined only by the claims which follow:

What is claimed is:

1. A packaged produce product including a plastic packaging material having a permeability to water vapor exceeding about 1.5 g mm m$^{-2}$ per day at 38°C. and 85–90% relative humidity and that allows the packaged produce product to be contained in an atmosphere which comprises approximately 4–20% $O_2$, 0.5%–17% $CO_2$ and has a relative humidity of 85–100%, said plastic packaging material being perforated to an extent at least partially determined by at least one of the following:

the temperature and storage time that the produce is expected to encounter;

a desired level of $CO_2$ for optimal preservation of the produce;

the respiration activity of the produce at said temperature; and the weight of the produce, whereby no condensation or minimal condensation appears on a surface of the material.

2. A packaged product according to claim 1 and wherein the plastic packaging material includes polymers that are given to hydrogen bonding or association with water.

3. A packaged product according to claim 1 and wherein the plastic packaging material includes a polyamide.

4. A packaged product according to claim 1 and wherein the plastic packaging material is macroperforated to have holes of approximately 1–10 mm diameter covering up to about 0.5% of the surface area of the material.

5. A packaged product according to claim 1 and wherein said plastic packaging material is microperforated to have holes of approximately 0.05–1 mm diameter in a density of up to about 2000 holes per square meter of the material.

6. A packaged product according to claim 1 and wherein said plastic packaging material is microperforated to have holes of approximately 0.3–1 mm diameter in a density of up to about 1000 holes per square meter of the material.

7. A packaged product according to claim 1 and wherein said product comprises produce.

8. A method of preserving produce comprising:

providing an unperforated plastic packaging material having a thickness of up to about 500 microns and a permeability to water vapor exceeding about 1.5 g mm $m^{-2}$ per day at 38° C. and 85–90% relative humidity;

perforating the material to an extent at least partially determined by least the optimal $CO_2$ atmosphere for preserving the produce; and at least partially enclosing the produce using the plastic packaging material, thereby to provide an environment for the produce which comprises approximately 4–20% $O_2$, 0.5%–17% $CO_2$, and has a relative humidity of 85–100%.

9. A method according to claim 8 and wherein the composition of the plastic packaging material includes polymers that are given to hydrogen bonding or association with water.

10. A method according to claim 8 and wherein the plastic packaging material includes a polyamide.

11. A method according to claim 8 and wherein the plastic packaging material is macroperforated to have holes of approximately 1–10 mm diameter covering up to about 0.5% of the surface area of the material.

12. A method according to claim 8 and wherein said plastic packaging material is microperforated to have holes of approximately 0.05–1 mm diameter in a density of up to about 2000 holes per square meter of the material.

13. A method according to claim 8 and wherein said plastic packaging material is microperforated to have holes of approximately 0.3–1 mm diameter in a density of up to about 1000 holes per square meter of the material.

14. A method for producing optimized packaging materials for packaging produce in an environment which is optimized in terms of carbon dioxide content and water condensation, the method including the steps of:

determining sensitivity of said produce to the presence of water condensation;

providing a plurality of unperforated package precursor materials having differing water vapor permeabilities, said materials having a permeability to water vapor exceeding about 1.5 g/mm $m^{-2}$ per day at 38° C. and 85–90% relative humidity;

selecting a package precursor material having a suitable water vapor permeability for a produce type to be packaged; and determining favorable carbon dioxide concentrations for said produce, perforating a package material selected in the selecting step to an extent at least partially determined by at least an optimal carbon dioxide concentration for said produce, to produce an optimized packaging material, which when used to at least partially enclose the produce provides an environment for the produce which comprises approximately 4–20% $O_2$, 0.5%–17% $CO_2$, and has a relative humidity of 85–100%.

15. A method according to claim 14 and also comprising:

applying the optimized packaging material to said produce for packaging thereof.

16. A method according to claim 14 and wherein said step of perforating includes selecting the number of a preselected size perforations per unit of the optimized packaging material.

17. A method according to claim 14 and wherein said plastic packaging material is perforated to have holes of at least 0.3 mm diameter in a density of up to about 1000 holes per square meter of the material.

18. A method according to claim 14 and wherein the weight of the produce exceeds 1 kilogram.

19. A method of preserving produce comprising:

providing an unperforated plastic packaging material having a thickness of up to about 500 microns and a permeability to water vapor exceeding about 1.5 g mm $m^{-2}$ per day at 38° C. and 85–90% relative humidity;

perforating the material to an extent at least partially determined by at least one of the following:

the temperature and storage time that the produce is expected to encounter;

a desired level of $CO_2$ for optimal preservation of the produce;

the respiration activity of the produce at said temperature; and the weight of the produce; and at least partially enclosing the produce using the plastic packaging material, thereby to provide an environment for the produce which comprises approximately 4–20% $O_2$, 0.5%–17% $CO_2$, and has a relative humidity of 85–100%.

20. A method according to claim 19 and wherein said plastic packaging material is perforated to have holes of at least 0.3 mm diameter in a density of up to about 1000 holes per square meter of the material.

21. A method according to claim 19 and wherein the weight of the produce exceeds 1 kilogram.

22. A method according to claim 19 and also comprising the additional step following the step of at least partially enclosing:

at least partially enclosing a plurality of units of produce already wrapped in said plastic packaging material using said plastic packaging material, thereby to provide an environment for the already wrapped produce which comprises approximately 4–20% $O_2$, 0.5%–17% $CO_2$, and has a relative humidity of 85–100%.

23. A method of preserving pre-packaged produce comprising:

providing an unperforated plastic packaging material having a thickness of up to about 500 microns and a permeability to water vapor exceeding about 1.5 g mm $m^{-2}$ per day at 38° C. and 85–90% relative humidity;

perforating the material to an extent at least partially determined at least by the optimal $CO_2$ atmosphere for preserving the produce; and at least partially enclosing pre-pack aged produce using the plastic packaging material, thereby to provide an environment for the produce which comprises approximately 4–20% $O_2$, 0.5%–17% $CO_2$, and has a relative humidity of 85–100%.

* * * * *